Patented Feb. 11, 1941

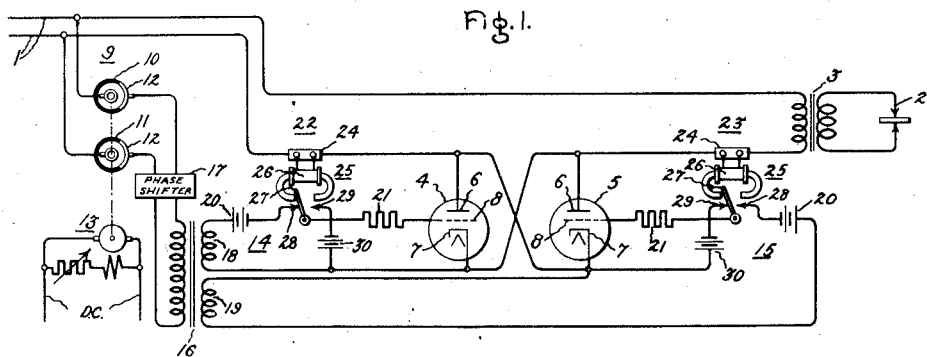

2,231,582

UNITED STATES PATENT OFFICE 2,231,582

ELECTRIC VALVE TRANSLATING APPARATUS

Henry de B. Knight and Bertram G. Higgins, Rugby, England, assignors to General Electric Company, a corporation of New York Application March 23, 1938, Serial No. 197,735
In Great Britain April 6, 1937

6 Claims. (Cl. 250—27)

Our invention relates to electric valve translating apparatus and more particularly to new and improved control circuits for electric valve systems.

In electric valve circuits where a load circuit is periodically energized from an alternating current supply circuit through electric valve apparatus, it is important to assure that the electric valves conduct current alternately to avoid saturation of associated inductive equipment, thereby preventing the establishment of large unidirectional currents which may deleteriously affect the electric valves. For example, in electric valve systems for energizing welding circuits, it is important to control the electric valves so that periodic energizations are initiated by the electric valve which was not last conducting so that the current conducted during the starting period is in a direction opposite to the current which was last conducted. In this manner, saturation of the associated inductive equipment, such as transforming apparatus, is avoided and the starting currents are maintained within a safe operating range. There has been evidenced need for new and improved control apparatus which assures this type of operation.

It is an object of our invention to provide a new and improved electric valve circuit.

It is another object of our invention to provide a new and improved control system for electric valve apparatus by virtue of which saturation of associated electric equipment is definitely prevented.

It is a further object of our invention to provide a new and improved control system for energizing a load circuit from an alternating current supply circuit through a pair of reversely connected electric valves, and whereby the electric valves are arranged to conduct current alternately.

In accordance with the illustrated embodiments of our invention, we provide improved control systems for electric valve apparatus in which a load circuit is periodically energized from an alternating current supply circuit through a pair of reversely connected electric valves. The electric valves are provided with control members which are energized to render the valves conductive periodically by means of associated excitation circuits. In order to assure that the electric valves conduct current alternately, we provide means responsive to the direction of current transmitted by the electric valves for maintaining one of the electric valves nonconductive until the other electric valve conducts current. Means responsive to the direction of current transmitted by the electric valves are connected in series relation therewith to impress on the control member of each of the electric valves a negative unidirectional biasing potential to maintain that valve nonconductive until the other valve conducts current.

In another illustrated embodiment of our invention, a load circuit is periodically energized from the alternating current supply circuit through a pair of reversely connected electric valves of the type employing a mercury pool cathode and associated control members of the make-alive or immersion-ignitor type. Each of the electric valves is provided with an excitation circuit which is energized in accordance with the anode-cathode voltage of an associated main electric valve and each includes an electric discharge device having a control member or grid which renders the electric valve conductive. Each of the electric discharge devices includes two control grids which control the conductivity thereof to effect energization of the associated immersion-ignitor control member at the desired times. A periodic voltage is impressed on one of the grids to render the discharge device and the associated electric valve conductive at the desired times, and a negative unidirectional biasing potential is impressed on the other grid to maintain the electric discharge device nonconductive after the associated main electric valve conducts current and until the other electric valve conducts. After the other electric valve conducts current, the negative unidirectional biasing potential is disconnected from the second grid to permit the other grid to render the discharge device conductive. In this manner, alternate conduction of the main electric valves is assured.

For a better understanding of our invention, reference may be had to the following description taken in connection with the accompanying drawing, and its scope will be pointed out in the appended claims. Fig. 1 of the drawing diagrammatically illustrates an embodiment of our invention as applied to an electric valve system wherein a pair of reversely connected electric valves effect energization of the load circuit; and Fig. 2 represents a further embodiment in which main electric valves are controlled by excitation circuits including auxiliary or control electric discharge devices.

Referring now to Fig. 1 of the accompanying drawing, our invention is represented as applied to an electric valve system for transmitting energy between an alternating current supply circuit 1 and a load circuit, such as a welding circuit 2, through a transformer 3 and electric valve means 4 and 5. The electric valve means 4 and 5 are preferably of the type employing ionizable mediums, such as gases or vapors, and each comprises an anode 6, a cathode 7 and a control member 8. Electric valves 4 and 5 are reversely connected in parallel so that alternating current may be transmitted to the welding circuit 2. In order to effect periodic energization of the welding circuit 2, we employ any conventional means, such as a switching device 9, which is interposed between the supply circuit 1 and excitation circuits for electric valves 4 and 5 to be described hereinafter. The switching device 9 may comprise two rotating drums 10 and 11 having contacts 12 which complete the circuit between the supply circuit 1 and the excitation circuits for the electric valves. The drums 10 and 11 may be driven by any suitable variable or controllable speed means such as a direct current motor 13. It is to be understood that the switching device 9 is illustrative of any conventional arrangement which may be employed to effect the desired energization of the welding circuit 2.

We employ excitation circuits 14 and 15 which are associated with electric valves 4 and 5, respectively, and which render these electric valves conductive by impressing on control members 8 thereof alternating voltages. Excitation circuits 14 and 15 are energized from a transformer 16 which is connected to be energized from the alternating current circuit 1 through the switching device 9. As a means for controlling the amount of energy transferred to the welding circuit 2 during each periodic energization thereof, we employ a suitable phase shifting device 17 which is interposed between the alternating current supply circuit 1 and the transformer 16. The phase shifting device 17 may be of any conventional type, such as a rotary phase shifter or a phase shifting circuit of the static impedance type. Transformer 16 is provided with secondary windings 18 and 19 which are associated with electric valves 4 and 5, respectively. Each of the excitation circuits 14 and 15 comprises a suitable source of negative unidirectional biasing potential, such as a battery 20, and a current limiting means such as a resistance 21 which is connected in series relation with the associated control member 8. In order to assure that the electric valves 4 and 5 conduct current alternately, irrespective of the time at which the electric valves are connected to the alternating current circuit 1 by means of the switching device 9, we provide means for impressing on the control members 8 negative unidirectional biasing potentials to maintain each of the valves nonconductive after it has conducted current and until the other electric valve has conducted current. To effect this control, we employ means 22 and 23 which are connected in series relation with the electric valves 4 and 5 and which are responsive to the direction of current conducted thereby. Each of the means may comprise a shunt 24 and a polarized electroresponsive relay 25 including a winding 26, a polarized armature member 27 and stationary contacts 28 and 29. When the armature 27 is in one position, the excitation circuits are connected to the control members and when in the other position a negative unidirectional biasing potential is impressed on the control members. A suitable source of negative biasing potential, such as a battery 30, may be used. It is to be understood that instead of employing shunt 24, we may use current transformers having primary windings connected in series relation with electric valves 4 and 5 and having secondary windings connected to the windings 26 of the relays 25.

In the arrangement of Fig. 1, the excitation circuits 14 and 15 are substantially independent of each other, that is, each of the electric valves 4 and 5 is energized independently from the transformer 16. In those applications where it is desired to control the electric valves so that one of the electric valves follows the other, our invention may be applied with equal facility to systems of that nature by employing only one current direction responsive means which is connected in the excitation circuit of the leading electric valve. For example, if it is desired to arrange the circuit so that electric valve 5 follows electric valve 4, alternate conduction of the electric valves 4 and 5 may be obtained by employing only a single current direction responsive device connected in excitation circuit 14. For example, this type of control may be applied to systems of the type disclosed and claimed in United States Reissue Patent No. 20,335 granted April 20, 1937 on an application of Harold W. Lord and assigned to the assignee of the present application.

The operation of the embodiment of our invention shown in Fig. 1 will be explained by considering the system when it is operating to effect periodic energization of the welding circuit 2 from the alternating current supply circuit 1. The periodicity of the energization of the welding circuit 2 is controlled by the speed of the motor 13 which drives the switching device 9. Of course, the number of impulses of current transmitted to the welding circuit 2 during each periodic energization thereof is determined by the frequency of the alternating current supply circuit 1 and the speed of motor 13. As is well understood by those skilled in the art, the amount of energy transmitted to the welding circuit 2 depends upon the time during the respective positive half cycles of applied anode-cathode voltage of electric valves 4 and 5 at which the electric valves are rendered conductive. The amount of energy transmitted to the welding circuit 2 is maximum when the electric valves are rendered conductive at points corresponding to the power factor angle during the positive half cycles of applied voltage, and the amount of energy transmitted is decreased as the time of ignition is retarded to later points in the positive half cycles. The amount of energy transmitted to the welding circuit 2 during each periodic energization of the circuit may be adjusted by means of the phase shifting circuit 17.

The current directional responsive means 22 and 23 control the electric valves 4 and 5 so that these electric valves conduct current alternately, irrespective of the time at which the circuit is energized by means of the switching device 9. These devices also insure alternate conduction of electric valves 4 and 5 so that the electric valve which was last conducting during the previous energization is maintained nonconductive until the other electric valve has conducted current, thereby preventing the establishment of a saturated condition of the transformer 3 and preventing the establishment of large unidirectional currents in the circuit. For the positions of the armature members 27 of the relays 25 shown in Fig. 1, upon closure of the circuit by means of the switching device 9 the electric valve 4 will be rendered conductive when the alternating voltage of secondary winding 18 of transformer 16 attains a value sufficient to overcome the effect of the negative unidirectional biasing potential furnished by battery 20. Upon being rendered conductive, electric valve 4 transmits an impulse of current from the supply circuit 1 to the transformer 3. The current transmitted through the shunt 24 energizes winding 26 of the relay 25 of means 22 so that the armature 27 is moved to the right-hand position, engaging stationary contact 29 which impresses on control member 8 of electric valve 4 a negative unidirectional biasing potential which maintains the electric valve 4 non-conductive. The relay 25 of the means 22, which is a polarized relay, effects this movement of the armature 27 when the electric valve 4 conducts current. Relay 25 of the means 23 would not permit the conduction of current by electric valve 5 irrespective of the time of energization of the excitation circuits by means of the switching device 9, because the armature member 27 thereof was in engagement with stationary contact 29 which impresses a negative unidirectional biasing potential on the control member 8 of the electric valve 5. However, upon conduction of current by electric valve 4, the armature 27 is moved to engage stationary contact 28 connecting the control member 8 to the excitation circuit 15 and putting electric valve 5 in condition to be rendered conductive during the next positive half cycle of applied anode-cathode voltage. During the succeeding positive half cycle of voltage after the conduction of current by electric valve 4, electric valve 5 will be rendered conductive by the excitation circuit 15 and the armature member 27 will be returned to engage stationary contact 29 to impress on control member 8 a negative unidirectional biasing potential, derived from battery 30, to maintain the electric valve 5 non-conductive until the electric valve 4 conducts current. Due to the conduction of current by the electric valve 5, the armature 27 of relay 25 associated with electric valve 4 will be moved to engage contact 28, so that this valve is in condition to be rendered conductive during the next positive half cycle of voltage impressed thereon. In this manner the electric valves 4 and 5 are rendered conductive alternately, independently of the time at which the excitation circuits are energized and independently of the period of energization of the welding circuit 2. Of course, it is to be understood that the welding circuit 2 may be energized by transmitting thereto a predetermined number of consecutive impulses during each period of energization, or the system may be controlled to transmit only a single impulse of current to the welding circuit 2 during each energization thereof.

In Fig. 2 of the accompanying drawing there is diagrammatically illustrated another embodiment of our invention which is similar in many respects to the arrangement shown in Fig. 1, and corresponding elements have been assigned like reference numerals. In the arrangement of Fig. 2, electric valves 31 and 32 are reversely connected in parallel relation with each other and in series relation with the primary winding of transformer 3. These electric valves are shown as being of the type employing an ionizable medium and comprise an anode 33, a cathode of the self-reconstructing type, such as a mercury pool cathode 34, and a control member 35 of the make-alive or immersion-ignitor type which is arranged to have an extremity thereof immersed below the surface of the mercury pool cathode 34, and which may be of a material having relatively large specific electrical resistivity as compared with that of the associated mercury. Boron-carbide or silicon-carbide may be the material used for the immersion-ignitor control members 35. In order to effect energization of the immersion-ignitor control members 35, we employ circuits which utilize the anode-cathode voltage of the main electric valves 31 and 32 and which are connected between the anodes and the cathodes of these valves. Each of these excitation circuits 36 and 37 includes a control electric discharge device 38 which is connected between the anode 33 and the control member 35 of the associated electric valve through a current limiting resistance 39. Electric discharge devices 38 are preferably of the type employing an ionizable medium and each comprises a cathode 40 and may comprise a pair of control members or grids 41 and 42 which control the conductivity thereof. In the particular arrangement shown, secondary winding 18 of transformer 16 is connected to the grid 41 through battery 20 and resistance 21 and the grid 42 is connected to be selectively energized by the associated relay 25. Considering the relay 25 in excitation circuit 36, it will be noted that the armature 27 is in the right-hand position and grid 42 is connected to the cathode 40, placing the tube in condition to be rendered conductive by the transformer 16. However, when the armature 27 is in the left-hand position, the grid 42 is connected to the battery 30 which impresses a negative unidirectional biasing potential thereon sufficient to maintain the discharge device 38 nonconductive irrespective of the potential impressed on the grid 41.

Although the electric discharge devices 38 in excitation circuits 36 and 37 have been shown as being of the type employing two control grids, it is to be understood that electric valves having single control grids may be used, in which case the connection of the relays 25 will be similar to that shown in the arrangement of Fig. 1.

The operation of the embodiment of our invention shown in Fig. 2 is substantially the same as described above in connection with the arrangement of Fig. 1. The periodic energization of the welding circuit 2 is established by the operation of the switching device 9. The electric valves 31 and 32 are made to conduct current alternately by virtue of the operation of the means 22 and 23 which are responsive to the direction of current transmitted by these valves. For the position of the armature members 27 of relays 25, shown in Fig. 2, the system is arranged to permit electric valve 31 to conduct current and to maintain electric valve 32 nonconductive until electric valve 31 conducts current. During the first positive half cycles of anode-cathode voltage for electric valve 31 after the energization of the excitation circuit 36, the electric discharge device 38 is rendered conductive by the voltage impressed on grid 41, effecting energization of the immersion-ignitor control member 35 and rendering electric valve 31 conductive. Upon conduction of current, armature 27 of relay 25, associated with electric valve 31, is moved to the left-hand position impressing on grid 42 of discharge device 38 a negative biasing potential to maintain the device nonconductive until electric valve 32 conducts current. Due to the conduction of current by electric valve 31, armature 27 of relay 25 associated with electric valve 32 is moved to the right-hand position, connecting grid 42 to the cathode 40 of discharge device 38 so that discharge device 38 may be rendered conductive during the next succeeding half cycle of voltage applied to the electric valve 32. Due to the fact that the relays 25 are responsive to the direction of current transmitted by the electric valves 31 and 32, alternate operation of the electric valves 31 and 32 is assured.

While we have shown and described our invention as applied to a particular system of connections and as embodying various devices diagrammatically shown, it will be obvious to those skilled in the art that changes and modifications may be made without departing from our invention, and we, therefore, aim in the appended claims to cover all such changes and modifications as fall within the true spirit and scope of our invention.

What we claim as new and desire to secure by Letters Patent of the United States, is:

1. In combination, an alternating current circuit, a load circuit, electric translating apparatus connected therebetween and comprising a pair of reversely connected electric valve means, said electric valve means each being provided with a control member for controlling the conductivity thereof, an excitation circuit for said electric valve means, and a pair of means each associated with a different one of said electric valve means and connected in series relation with both of said electric valve means and each being responsive to the direction of current conducted by said electric valve means for controlling said excitation circuit to maintain one of said electric valve means non-conductive until the other of said electric valve means conducts current.

2. In combination, an alternating current supply circuit, a load circuit, electric translating apparatus connected therebetween and comprising a pair of reversely connected electric valves each including a control member for controlling the conductivity thereof, an excitation circuit for energizing the control members to render said electric valves conductive, and a pair of electromagnetic means each associated with a different one of said electric valve means and connected in series relation with both of said electric valves and being responsive to the direction of current conducted thereby to maintain one of said electric valves nonconductive until the other valve conducts current to assure alternate conduction by said electric valves.

3. In combination, an alternating current supply circuit, a load circuit, electric translating apparatus connected therebetween and comprising a pair of reversely connected electric valves each including a control member for controlling the conductivity thereof, an excitation circuit for energizing the control members to render said electric valves conductive and comprising a source of periodic voltage, a source of negative unidirectional biasing potential, and a pair of electromagnetic means each associated with a different one of said electric valve means and connected in series relation with both of said electric valves and being responsive to the direction of current conducted thereby to connect said source of biasing potential to the control member of one of said valves to maintain said one valve nonconductive until the other valve conducts current to assure alternate conduction by said electric valves.

4. In combination, an alternating current supply circuit, a load circuit, electric translating apparatus connected therebetween and comprising a pair of reversely connected electric valves each including an anode, a cathode and a control member for controlling the conductivity thereof, a pair of excitation circuits each associated with a different one of said electric valves and each comprising an electric discharge device connected across the anode and the control member of the associated electric valve, said electric discharge device including a control member for controlling the conductivity thereof, and means connected in series relation with both of said electric valves and being responsive to the direction of current conducted thereby for controlling the associated electric discharge devices to maintain one of said electric valves nonconductive until the other valve conducts current to assure alternate conduction by said electric valves.

5. In combination, an alternating current supply circuit, a load circuit, electric translating apparatus connected therebetween and comprising a pair of reversely connected electric valves each including an anode, a cathode and a control member of the immersion-ignitor type, a pair of excitation circuits each associated with a different one of said electric valves and each comprising an electric discharge device connected across the anode and the immersion-ignitor control member of the associated electric valve, the electric discharge devices each including a control member for controlling the conductivity thereof, means for impressing periodic voltages on the control members of the electric discharge devices to energize the associated immersion-ignitor control members, a pair of sources of negative unidirectional biasing potential, each associated with a different one of the electric discharge devices, and means connected in series relation with both of said electric valves and being responsive to the direction of current conducted thereby for connecting the associated source of biasing potential to the control members of the electric discharge devices to maintain the associated electric valve non-conductive until the other electric valve conducts current to assure alternate conduction by said electric valves.

6. In combination, an alternating current supply circuit, a load circuit, electric translating apparatus connected therebetween and comprising a pair of reversely connected electric valves each including an anode, a cathode and a control member for controlling the conductivity thereof, a pair of excitation circuits each associated with a different one of said electric valves for energizing the control member thereof and each comprising an electric discharge device having two grids, means for impressing on one of said grids a periodic voltage to render the associated electric valve conductive periodically, a source of negative unidirectional biasing potential, and means connected in series relation with both of said electric valves and being responsive to the direction of current conducted thereby for connecting said source of biasing potential to the other of said grids to maintain one of said electric valves non-conductive until the other valve conducts current to assure alternate conduction by said electric valves.

HENRY DE B. KNIGHT.
BERTRAM G. HIGGINS.